United States Patent Office 3,399,849
Patented Sept. 3, 1968

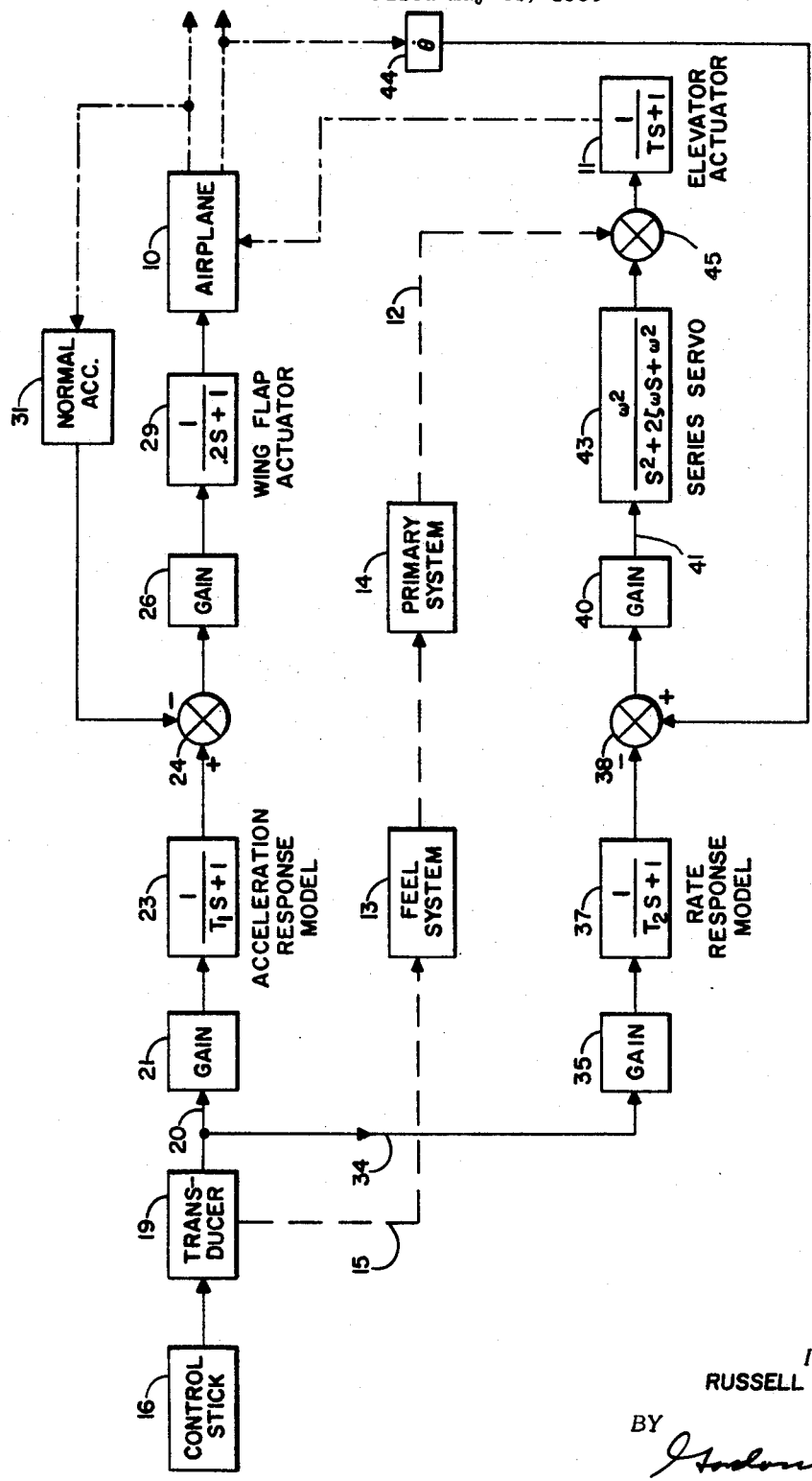

3,399,849
LIFT AND PITCH CONTROL APPARATUS FOR AIRCRAFT
Russell C. Hendrick, Fridley, Minn., assignor to Honeywell Inc., Minneapolis, Minn., a corporation of Delaware
Filed May 11, 1966, Ser. No. 549,199
5 Claims. (Cl. 244—77)

ABSTRACT OF THE DISCLOSURE

Operation of a conventional manual control stick of an aircraft concurrently operates the wingflaps of an aircraft to obtain a direct lift control and operation of the elevator surface to alter angle of attack and additionally provide increase in lift for an aircraft. Operation of the control stick supplies an electrical signal to a Model to control the displacement of the wing flaps and a normal accelerometer senses the acceleration due to increased lift to balance the output from the Model. Operation of the control stick also directly through the conventional primary system controls the operation of the elevator and also through a stick force transducer supplies a stick force signal to a Rate Model to control a series servo which additionally operates the elevator surface. The Model provides for a desired aircraft response rate. Gain devices are provided so that the magnitude of the stick force signal supplied to control the wing flaps and the elevator may be proportioned to obtain the desired response.

---

This invention relates to improvements in control apparatus for dirigible crafts such as aircraft, and in particular to a system for both automatically stabilizing an aircraft while in motion and also enabling superimposed manual maneuvering of the aircraft. The present invention is embodied for purpose of disclosure to apparatus for the control of an aircraft about its pitch axis and presupposes that such aircraft has a conventional elevator control surface or other means for applying rotational moments to the craft and also has conventional wing flaps or other means for applying vertical forces to the craft. Other satisfactory control combinations for application of the subject invention include an elevator surface and a canard surface, an elevator surface and ailerons, or a canard surface and wing flaps.

It is an object of this invention to manually control by means of forces or motions applied to the conventional control wheel or stick the positioning of the elevator surface and the wing flaps of the aircraft to adjust the altitude of the aircraft while in flight.

A further object of this invention is to jointly control the displacement of the elevator surface and the wing flaps of the aircraft by manual control to adjust the altitude of the craft while avoiding undesirable attitude changes of the craft which might inhibit precise and rapid control, might interfere with forward vision of the pilot of the craft, and might result in dangerous touchdown attitudes.

It is a further object of this invention to control the elevator surface and wing flaps of the aircraft from a single manual controller in which a desired pitch rate of the craft is obtained and a desired normal acceleration is obtained, the two quantities being produced in independent magnitudes and dynamic characteristics, as established by arbitrary settings of the control apparatus.

Other objects and advantages of this invention will become more readily apparent upon a detailed consideration of the following specification, taken in conjunction with the accompanying drawing schematically illustrating a pitch axis control system for an aircraft embodying the present invention.

In accordance with the present invention, when the pilot wishes to increase the altitude of his aircraft, he operates not only the elevator surface of the craft but also operates the wing flaps of the aircraft. By operating the wing flaps of the aircraft he obtains directly an increase in lift of the wing surfaces and thus effects a "direct lift" control of the aircraft. The simultaneous operation of the elevator surface maintains a desirable attitude during the maneuver. If, on the other hand, the elevator surface only were displaced to cause a change in altitude of the craft, the angle of attack increase required to cause the altitude increase would require the craft to be tilted upwardly, and in this sense would not provide such direct or immediate increase in aircraft lift because of the rotational inertia of the craft. Thus by the present invention, the aircraft altitude is more quickly increased than would be obtained by conventional operation of the elevator surface alone, and an independent and desirable relationship may be established between rotational and vertical motion.

Aircraft assigned to aircraft carriers for flight operations are manually controlled during the landing of such aircraft on the flight deck of the carrier. During the approach of the aircraft to the landing deck of the carrier, the pilot of the aircraft may decide to increase his altitude as he approaches the carrier. While the increase in altitude is often accomplished merely by movement of the elevator surface, in some cases extreme movements of the elevator surface to obtain quickly the desired increase in altitude may cause the front end or nose of the aircraft to tilt to such an upward angle as to interfere with the pilot's forward vision. Such interference may prevent somewhat the pilot from seeing the flight deck of the carrier to determine if he is approaching properly.

Control apparatus in which the elevator surface and the wing flaps have been operated at substantially the same time is not new herein. Prior art examples of operating the wing flaps and elevator surface at substantially the same time are shown in U.S. patent to Kutzler 3,104,083 or Snodgrass 2,816,724. However in these prior art arrangements, the elevator surface has been displaced in a fixed and invarient manner as the wing flaps have been operated. Usually in the prior art, the concurrent operation of the wing flaps and the elevator surface has been provided to prevent change in trim attitude of the aircraft while making relatively fixed and long term adjustments in flap position. The arrangement in the subject invention, however, is designed to provide concurrent operation of flaps and elevator during normal and continuous maneuvering of the craft through the conventional control wheel or stick. Furthermore, the invention will enable an arbitrary and adjustable relationship between craft normal acceleration and rotational attitude as dictated by specific operational requirements or aircraft type.

Proceeding now with a detailed description of the invention, and referring to the sole figure, in the block diagram, an airplane 10 is conventionally provided with an elevator surface (not shown) positioned by an elevator actuator 11. The actuator is directly controlled through a primary system comprising operating means 12, 14, 15 and a conventional control stick 16. Thus the displacement of the control stick 16 from a normal position determines the extent of displacement of the elevator surface from a normal position. The control stick 16 is conventionally supplied with a stick force feel system 13 such as spring actuated means for returning the manually operated stick to a normal position upon release thereof.

Associated with the control stick 16 is a stick force transducer 19 which develops an electric signal in proportion to the amount of force applied to the stick 16. The signal from the stick force transducer 19 is transmitted by conductor 20 to a first gain device 21 and is then translated through an Acceleration Response Model 23 having the transfer function indicated to a signal summing device 24. From the summing device 24 the resultant electrical signal is transmitted through a second gain device 26 to a proportional wing flap actuator 29 of the aircraft which operates the wing flaps (not shown) of the airplane 10. The resulting change in the wing configuration caused by lowering of the flaps immediately results in an increased lift in the aircraft thereby causing a normal acceleration. This acceleration is sensed by normal accelerometer 31 which supplies an electrical signal in feedback relation to the summing point 24 where it opposes the stick force electrical signal, so that normal acceleration varies in accordance with stick force.

The electrical signal from transducer 19 is also supplied by conductor 34, a third gain device 35, to a Rate Response Model 37. The output signal from the Rate Response Model is supplied to an electrical signal summing device 38, and the resultant signal from device 38 is supplied through a fourth gain device 40, conductor 41, to a Series Servo 43. The Servo 43 controls the elevator actuator 11 independently of the primary system, and to this end, its operation is supplied to a mechanical summing arrangement, such as a differential 45, to the actuator 11. Such direct operation of a control surface actuator supplemented by operation of a series servo motor is illustrated by the U.S. patent to Mallery 2,852,212 showing the control stick 24 and the series servo motor 26. A similar arrangement is shown in the U.S. patent to Gibson 3,005,606 showing the control stick 1 with a stick force transducer 42 which through a function generator controls the series servo motor 18 and wherein direct operation of the stick 1 is transmitted through linkage 2, having a Feel system 6 associated, therewith, to the power control valve 5. An aircraft pitch rate sensor 44 supplies a feedback signal to summing device 38.

With respect to the models 23 and 37, the Rate Responsive Model 37 shapes the electrical command signal from the stick force transducer 19 to obtain the desired dynamic response of the aircraft, i.e., how fast do we obtain a pitch rate of the aircraft, sensed by the pitch rate gyro 44 and applied to the summing device 38 in feedback relation, for the applied stick force. Since the command signal from transducer 19 and the feedback signal from rate gyro 44 are of opposing sign, when they balance operation of the proportional series servo terminates.

In a similar way, the Acceleration Response Model 23 shapes the electrical signal from transducer 19 to obtain the desired normal acceleration response of the aircraft.

With respect to the symbols in the figure, T is the conventional symbol for the time constant which may be that of an electrical circuit; S is the conventional La Place operator; zeta is the symbol for damping ratio; and omega is the natural frequency of the series servo.

It will now be apparent that from the figure we have provided two separate control loops about a manually operable primary system. The primary system is an open loop system, and it alone would not give the desired dynamic response of the aircraft due to manually controlled elevator displacement, since it has no Rate Response Model nor rate gyro feedback which measures the departure of the actual pitch rate of the craft from the desired pitch rate of the craft. Similarly, the normal acceleration loop comprising model 23 and accelerometer 31, responsive to vertical aircraft accelerations, provides means for obtaining the desired dynamic acceleration of the aircraft.

By means of operation of the wing flaps, the aircraft lift force is immediately increased to provide "direct lift" and immediate vertical acceleration is provided. This change in altitude may be supplemented by joint operation of the elevator surface which through the control channel including Rate Response Model 37 and the rate sensor 44 provide an angle of attack change at controlled pitch rates that will add to the direct lift obtained from the wing flaps.

By means of the gain devices 21 and 35 the amount of direct lift obtained from the wing flaps relative to that increase in lift obtained through operation of the elevator surface can be selected in accordance with the type of aircraft being flown.

What I claim as new and desire to secure by Letters Patent of the United States is:

1. In an aircraft having a control surface for changing craft attitude and means for positioning said control surface in response to displacement of a manually operable controller from a normal position to change attitude thereof, means for increasing pilot handling qualities of the craft comprising:

a force transducer responsive to the manual force applied to the manually operable controller and providing a control signal;

additional means responsive to the force signal from the controller operating lift control means of the aircraft causing vertical acceleration;

means sensing vertical acceleration opposing the force signal in the additional means;

the operation of the control surface and of the lift control means tending primarily to increase altitude of the aircraft;

further means responsive to the force transducer signal additionally operating the control surface positioning means;

craft pitch rate responsive means providing a signal additionally controlling said further means;

and means in the additional means varying the relative time and varying the relative proportion of the signal from the transducer supplied to the additional means and further means.

2. The apparatus of claim 1, wherein the force transducer signal is applied to said further means through a rate responsive model to obtain the desired pitch rate dynamic response of the aircraft.

3. In a manual operable aircraft boost control system comprising in combination a displaceable pilot's control stick, an elevator surface power actuator, and a mechanical linkage connecting the control stick and the actuator, means for improving the rate of response in pitch of the craft to displacement of the pilot's control stick comprising:

a stick force transducer producing an electrical signal in accordance with the applied stick force, a desired aircraft pitch rate response model receiving said force signal a pitch rate gyro providing a second electrical signal, means combining the stick force signal from said model and pitch rate gyro signals to compare the desired dynamic response and actual pitch rate response and a series servo controlled by said combining means and jointly with said control stick displacement controlling said elevator actuator.

4. The apparatus of claim 3, and an accelerometer positioned in the aircraft and responsive to normal acceleration and developing a third electrical signal, means combining the stick force signal and acceleration signal, and means controlled by the combining means operating wing flaps of the aircraft.

5. The apparatus of claim 4, and means in the combining means for relatively varying the magnitude of the stick force signal applied to the wing flap actuator and the series servo, to select pitch rate and normal acceleration responses for the craft.

References Cited

UNITED STATES PATENTS

| | | | |
|---|---|---|---|
| 2,816,724 | 12/1957 | Snodgrass | 244—77 |
| 2,967,680 | 1/1961 | Meyers et al. | 244—77 |
| 3,240,447 | 3/1966 | Olshausen | 244—77 |
| 2,985,409 | 5/1961 | Atwood et al. | 244—77 |
| 3,236,478 | 2/1966 | Adams et al. | 244—76 |

FERGUS S. MIDDLETON, *Primary Examiner.*